K. KUROKI.
FISH BAIT.
APPLICATION FILED NOV. 1, 1916.

1,237,529.

Patented Aug. 21, 1917.

INVENTOR
KAIKO KUROKI

BY

ATTY.

UNITED STATES PATENT OFFICE.

KAIKO KUROKI, OF MONTEREY, CALIFORNIA.

FISH-BAIT.

1,237,529.   Specification of Letters Patent.   Patented Aug. 21, 1917.

Application filed November 1, 1916. Serial No. 128,907.

*To all whom it may concern:*

Be it known that I, KAIKO KUROKI, a subject of the Emperor of Japan, residing at Monterey, in the county of Monterey and State of California, have invented new and useful Improvements in Fish-Baits, of which the following is a specification.

My invention relates to improvements in artificial baits for fish, the object of the invention being to provide an artificial bait which will greatly resemble the appearance of a small fish in motion, thereby rendering it very effective for hooking large fish which prey upon the smaller ones.

Figure 1:
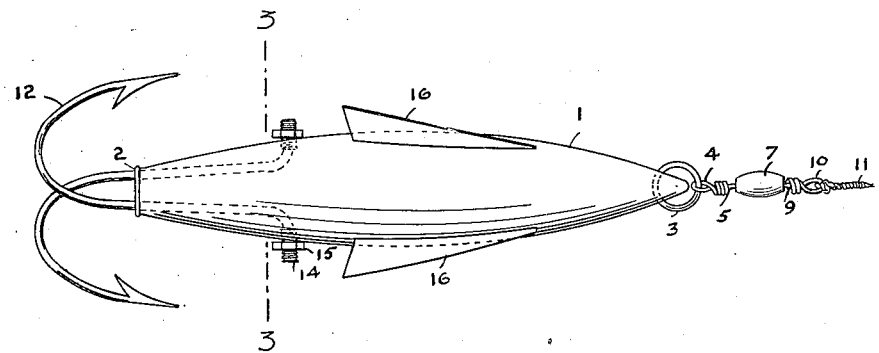
Figure 2:
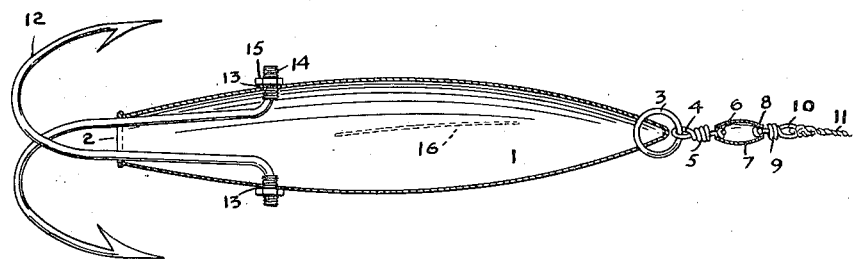
Figure 3:
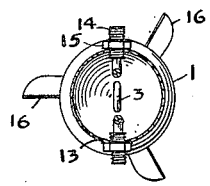

In the accompanying drawing, Figure 1 is a side view of my improved artificial bait; Fig. 2 is a longitudinal section thereof; Fig. 3 is a transverse section on the line 3—3 of Fig. 1.

Referring to the drawing, 1 indicates a hollow bait of thin light-colored metal, substantially cigar-shaped in form, its front half tapering almost to a point, and its rear half terminating in an opening 2 considerably larger than its front end.

Through diametrically opposite holes near its pointed front end is inserted a ring 3, connected to a loop 4 formed on a twisted wire 5, an end of which wire is formed with a head 6, received within a hollow swivel casing 7, and retained within said casing by the adjacent contracted open end thereof, the head 8 of a similar wire 9 being retained within the casing at the other end, said wire 9 being formed with a loop 10 which can be connected to a fishing line 11.

Through the open rear end of the cigar-shaped body extend the shanks of hooks 12, the inner ends of said shanks being bent at right angles to the shanks and extending through diametrically opposite holes 13 in the sides of said body, said ends being formed with threaded enlargements 14 extending outside said body, nuts 15 being screwed upon said enlarged ends.

Upon the outer surface of the cigar-shaped body are secured fins 16 extending longitudinally of the body but slightly obliquely all in the same rotary direction, and being enlarged in width at their rear ends.

By reason of the swivel connection of the body of the bait with the fishing line, said body can rotate freely about its axis, and it is caused to rotate when passing through the water, or when held stationary against a current of water passing around it, by the longitudinally and obliquely extending fins. The rapid rotation thus given to the cigar-shaped body causes the bait to resemble in general a small fish in motion, while at the same time said rotation prevents a larger fish detecting the difference between the bait and a fish, and also obscures the hooks upon the rear end of the bait. The bait is therefore very successful in catching fish.

The construction permits of the hooks being removed when broken or otherwise injured and fresh hooks substituted therefor.

I claim:—

A fish bait comprising a hollow, round, substantially cigar-shaped body open at the rear end and having holes near its rear end, hooks, the shanks of which are contained in said hollow body and extend rearwardly through said open rear end, and having front threaded ends extending outwardly through said rear holes, and nuts screwed on their front ends on the outside of said hollow body.

KAIKO KUROKI.